United States Patent [19]

Landa

[11] 4,326,644
[45] Apr. 27, 1982

[54] SAWTOOTH FEEDER WITH JAM PREVENTER

[75] Inventor: Benzion Landa, Edmonton, Canada

[73] Assignee: Savin Corporation, Valhalla, N.Y.

[21] Appl. No.: 107,885

[22] Filed: Dec. 28, 1979

[51] Int. Cl.³ .............................................. B65H 3/32
[52] U.S. Cl. .................................... 221/263; 111/77
[58] Field of Search ............. 221/263, 266, 265, 160, 221/251, 264, 168, 173; 111/77

[56] References Cited

U.S. PATENT DOCUMENTS

| | | | |
|---|---|---|---|
| 990,593 | 4/1911 | Ringland et al. | 221/265 X |
| 1,879,055 | 9/1932 | Boykin | 221/266 |
| 1,913,324 | 6/1933 | Altinger | 221/266 |
| 2,033,090 | 3/1936 | Barker | 221/160 X |
| 2,772,811 | 12/1956 | Schaef | 221/263 X |
| 3,863,804 | 2/1975 | Diaz et al. | 221/251 |
| 3,910,295 | 10/1975 | Fletcher | 133/8 R |

*Primary Examiner*—Stanley H. Tollberg
*Attorney, Agent, or Firm*—Shenier & O'Connor

[57] ABSTRACT

A ball injector for feeding balls to the ball gun of a ballistic printer in which a ball guide or separator is provided with a passage for receiving balls, a rotary saw blade whose teeth extend into the passage is driven to supply balls trapped between the teeth of the blade to the passage. To prevent jamming of a ball between one of the teeth and the passage entrance, a barrier having a resilient leading edge is disposed along the ball path portion adjacent the passage entrance. Preferably the resilient edge has a small radius of curvature and is disposed obliquely relative to the ball path.

16 Claims, 5 Drawing Figures

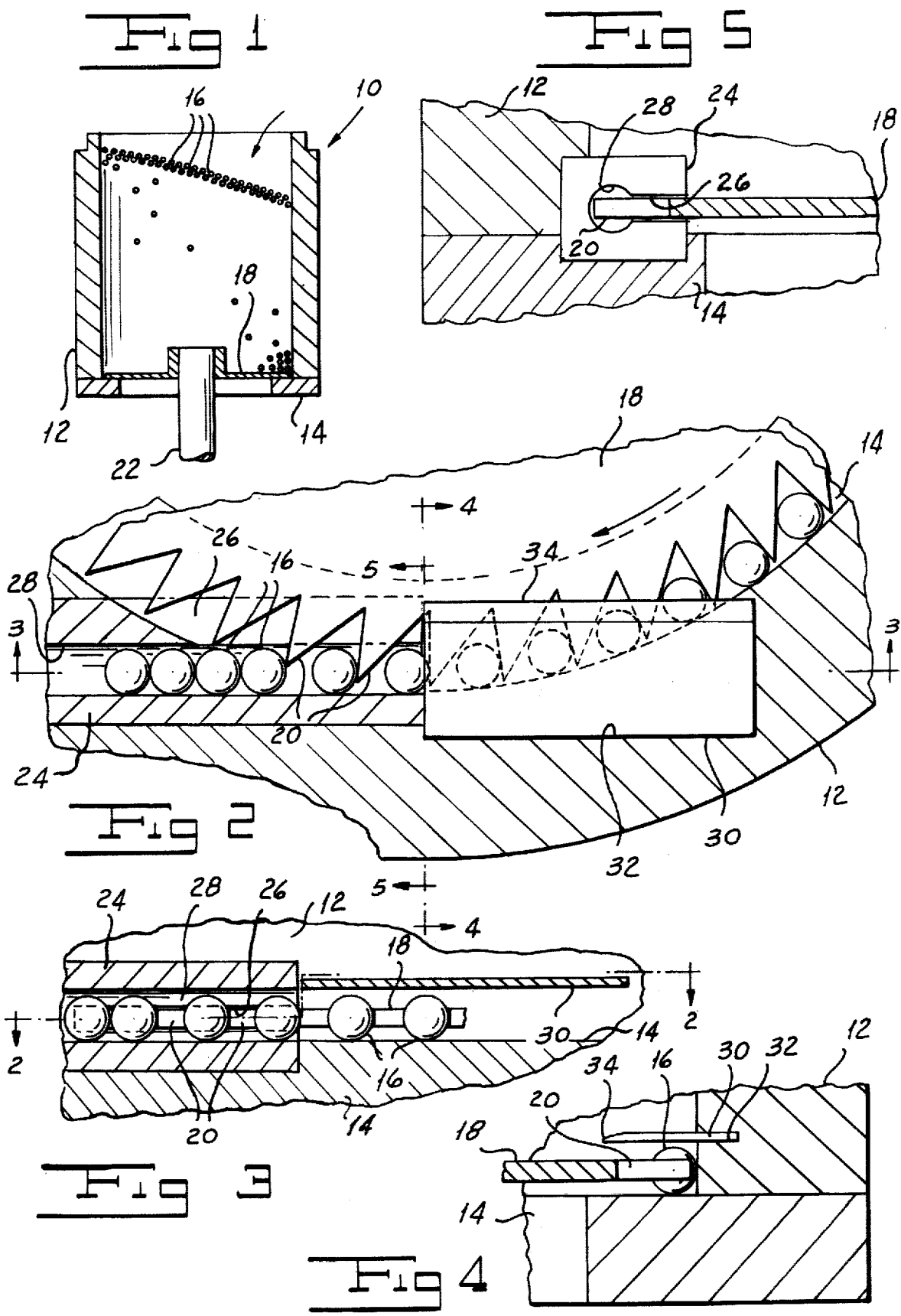

SAWTOOTH FEEDER WITH JAM PREVENTER

BACKGROUND OF THE INVENTION

My invention relates to a device for rapidly and reliably feeding solid balls, pellets and the like one by one from a bulk supply through an outlet.

There are numerous instances in which solid articles, such as balls or pellets or the like must be fed serially through an opening from a bulk supply of the articles. Moreover, this operation must be performed at high rates of speed and with a high degree of reliability. One such instance is in the microballistic printer described in my copending application Ser. No. 39,372, filed May 15, 1979. In that application I describe a printer which directs a plurality of small balls about one millimeter in diameter in extremely rapid succession against a printing medium such as a ribbon overlying a sheet of paper. In the ball gun of the printer, which is movable about orthogonal axes for targeting, balls are successively introduced into a resilient breech which is slightly smaller in diameter than the balls and behind which air is maintained under pressure. The ball is fired by pushing it sufficiently far through the breech to snap it through to the barrel side and allow the pressurized air to expand into the barrel and propel the ball outwardly.

I have invented a sawtooth feeder with jam preventer for feeding solid articles one by one from a bulk supply through an opening. More specifically, my feeder is especially adapted for use with my microballistic printer disclosed in the copending application referred to hereinabove. In such an installation balls are fed serially from the bulk supply into a passage leading to the resilient breech. As a ball enters the passage a ball is dislodged from the breech. My feeder is capable of extremely high rates of operation up to approximately 2000 balls per second.

SUMMARY OF THE INVENTION

One object of my invention is to provide a sawtooth feeder with jam preventer for feeding solid objects one by one from a bulk supply through an outlet opening.

A further object of my invention is to provide a sawtooth feeder which operates reliably without jamming.

Another object of my invention is to provide a sawtooth feeder which is capable of high-speed operation.

A still further object of my invention is to provide a sawtooth feeder which is especially adapted for use with a microballistic printer.

Other and further objects will be apparent from the following description.

In general, my invention contemplates apparatus for feeding solid articles one-by-one from a bulk supply in which a first member is provided with a passage for receiving articles while a second, toothed member is movable along a path from the bulk supply into the entrance of the passage to deliver articles supplied to the path individually to the passage. To prevent jamming of an article between one of the teeth and the passage entrance, I dispose a barrier having a resilient leading edge along the path portion adjacent the entrance.

BRIEF DESCRIPTION OF THE DRAWINGS

In the accompanying drawings to which reference is made in the instant specification and which is to be read in conjunction therewith and in which like reference characters are used to indicate like parts in the various views:

FIG. 1 is a section of my sawtooth feeder with jam preventer.

FIG. 2 is an enlarged fragmentary section of my sawtooth feeder with jam preventer taken along line 2—2 of FIG. 3 illustrating the ball separator and adjacent raceway portion.

FIG. 3 is an enlarged fragmentary section of my sawtooth feeder with jam preventer taken along line 3—3 of FIG. 2.

FIG. 4 is an enlarged fragmentary section of my sawtooth feeder with jam preventer taken along line 4—4 of FIG. 2.

FIG. 5 is an enlarged fragmentary section of my sawtooth feeder with jam preventer taken along line 5—5 of FIG. 2.

DETAILED DESCRIPTION OF THE PREFERRED EMBODIMENT

Referring now to the drawings, my feeder, indicated generally by the reference numeral 10, includes a generally cylindrical outer wall 12 having a radially inwardly extending ring 14 disposed at the lower end thereof. A rotary saw blade 18 having spaced teeth 20 on its periphery and mounted on a shaft 22 is disposed coaxially within the outer wall 12 at the bottom thereof, being spaced slightly from the inner surface of the wall 12 as well as from the upper surface of the ring 14. The reservoir formed by cylinder 12 contains a bulk supply of solid articles such as balls.

I so select the spacing of the teeth 20 relative to the diameter of the balls 16 that as the saw blade 18 is rotated, the lowermost balls 16 in the reservoir fall into the recesses between the teeth 20 to be carried circumferentially around the bottom of the reservoir as shown in FIG. 2. Balls 16 moved along the circular path in this manner enter a ball separator 24, which strips the balls 16 from blade 18, diverts the balls from their circular path and redirects them along a passage 28 tangential to the circular ball path at the entrance thereof. To facilitate stripping of the balls 16 from the teeth 20, I form a slot 26 in the separator 24 for receiving a peripheral portion of the blade 18. The height of slot 26 is less than the ball diameter. Balls entering the passage 28 are thus constrained to follow the straight-line path along the passage rather than the circular path followed by the blade 18.

I cover the portion of the circular ball path immediately preceding the ball separator 24 with a relatively thin resilient strip 30. Strip 30, which may be formed of plastic and which fits into a slot 32 formed in the cylindrical wall 12, is so formed as to have a tapered small-radius leading edge 34 which is disposed obliquely relative to the adjacent portion of the circular ball path.

In normal operation, the balls 16 will fall into the recesses between teeth 20 well before the strip 30 and, as shaft 22 is driven by any suitable means such as a motor (not shown) the teeth 20 carry the balls into passage 28. Occasionally, however, a ball may start to drop into an empty recess just as the recess is approaching the leading edge 34 of the strip. In most instances when this occurs, the edge 34 will engage the ball 16 along the off-center line of action with the blade 18, definitely urging the ball either downwardly into the recess or upwardly into the ball reservoir. Even if the line of action extends through the center of the ball 16, the direction of force against the resilient strip edge 34 will be such as to lift it slightly, displacing the line of action upwardly to pop the ball into the recess.

It will be seen that I have accomplished the objects of my invention. I have provided apparatus for feeding solid articles one by one from a bulk supply through an outlet. My feeder is capable of high-speed operation. It is especially adapted for use with a microballistic printer. I provide it with means for inhibiting jamming.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. Apparatus for feeding balls one by one from a bulk supply of balls including in combination, a container for holding said supply, said container having an inner wall and a base, means forming a passage of generally circular cross section leading outwardly through said wall, said passage having a diameter slightly greater than that of one of said balls, means forming a slot leading into said passage, the height of said slot being less than the diameter of one of said balls, a generally circular disk having peripheral teeth and intertooth spacings adapted to receive balls, said disk having a diameter at the locus of the ends of said teeth which is slightly less than the diameter of said inner wall, and being mounted in said container over said base with a peripheral portion thereof disposed in said slot, means for driving said disk to cause balls moved into said passage by said disk to be stripped from said disk by the portion of said slot forming means at the entry to said passage, and a blade carried by the wall of said reservoir and extending from a point adjacent to the top of said passage over a peripheral portion of said disk and radially inwardly for a distance greater than the diameter of a ball to ensure that a ball either fully enters or does not enter each of said intertooth spaces as it approaches said entry thus to prevent hang up of a ball between said disk and said passage forming means.

2. Apparatus for feeding balls one by one from a bulk supply of balls including in combination, a container for holding said supply, said container having an inner wall and a base, means forming a passage of generally circular cross section leading outwardly through said wall, said passage having a diameter slightly greater than that of one of said balls, means forming a slot leading into said passage, the height of said slot being less than the diameter of one of said balls, a generally circular disk having peripheral teeth and intertooth spacings adapted to receive balls, said disk having a diameter at the locus of the ends of said teeth which is slightly less than the diameter of said inner wall, and being mounted in said container over said base with a peripheral portion thereof disposed in said slot, means for driving said disk to cause balls moved into said passage by said disk to be stripped from said disk by the portion of said slot forming means at the entry to said passage, and a flexible blade carried by the wall of said reservoir and having a knife edge extending from a point adjacent to the top of said passage entry over a peripheral portion of said disk to the top of said passage entry to ensure that a ball either fully enters or does not enter each of said intertooth spaces as it approaches said entry thus to prevent hang up of a ball between said disk and said passage forming means.

3. Apparatus for feeding balls one by one from a bulk supply of balls including in combination, a container for holding said supply, said container having an inner wall and a base, means forming a passage of generally circular cross section leading outwardly through said wall, said passage having a diameter slightly greater than that of one of said balls, means forming a slot leading into said passage, the height of said slot being less than the diameter of one of said balls, a generally circular disk having peripheral teeth and intertooth spacings adapted to receive balls, said disk having a diameter at the locus of the ends of said teeth which is slightly less than the diameter of said inner wall and being mounted in said container over said base with a peripheral portion thereof disposed in said slot, means for driving said disk to cause balls moved into said passage by said disk to be stripped from said disk by the portion of said slot forming means at the entry to said passage, said balls entering the intertooth spaces of said disk at locations in advance of said passage entry with reference to the direction of movement of said disk and means extending from said passage entry toward said locations for ensuring that a ball either fully enters or does not enter each of the respective intertooth spaces as it approaches said entry.

4. Apparatus for feeding balls one by one from a bulk supply of balls including in combination, a container for holding said supply, said container having an inner wall and a base, means forming a passage of generally circular cross section leading outwardly through said wall, said passage having a diameter slightly greater than that of one of said balls, means forming a slot leading into said passage, the height of said slot being less than the diameter of one of said balls, a generally circular disk having peripheral teeth and intertooth spacings adapted to receive balls, said disk having a diameter at the locus of the ends of said teeth which is slightly less than the diameter of said inner wall and being mounted in said container over said base with a peripheral portion thereof disposed in said slot, means for driving said disk to cause balls moved into said passage by said disk to be stripped from said disk by the portion of said slot forming means at the entry to said passage, and means adjacent to the said entry for inhibiting hang up of a ball between said disk and said passage forming means.

5. Apparatus for feeding balls one by one from a bulk supply of balls including in combination, a container for holding said supply, said container having an inner wall and a base, means forming a passage of generally circular cross section leading outwardly through said wall, said passage having a diameter slightly greater than that of one of said balls, means forming a slot leading into said passage, the height of said slot being less than the diameter of one of said balls, a generally circular disk having peripheral teeth and intertooth spacings adapted to receive balls, said disk having a diameter at the locus of the ends of said teeth which is slightly less than the diameter of said inner wall and being mounted in said container over said base with a peripheral portion thereof disposed in said slot, and means for driving said disk to cause balls moved into said passage by said disk to be stripped from said disk by the portion of said slot forming means at the entry to said passage.

6. Apparatus for feeding balls including in combination means forming a passage for receiving said balls, said passage-forming means having a portion defining an entrance to said passage, means for individually delivering balls to said passage, said delivering means comprising a toothed member and means for moving said member so as to move said teeth along a path into said entrance, means for supplying balls to said path, and resilient means having a resilient leading edge and disposed along the portion of said path adjacent said entrance for preventing balls from jamming between said toothed member and said passage portion, said leading edge being obliquely disposed relative to said path.

7. Apparatus for feeding balls including in combination a container for holding a supply of balls, said container having an inner wall and a base, means forming a passage leading outwardly through said wall, said passage being adapted to receive said balls and being formed with a slot along a portion of said passage extending from the entrance thereof, a disk having peripheral teeth adapted to extend into said passage through said slot and intertooth spacings adapted to receive said balls, said disk being mounted in said container over said base for successive movement of said teeth into said passage through the entrance thereof and out of said passage through said slot, and means for driving said disk to feed balls supplied to said intertooth spacings into said passage, said slot being formed narrower than the diameter of said balls to ensure stripping of said balls from said disk as said teeth emerge from said passage through said slot.

8. Apparatus for feeding balls including in combination a container for holding a supply of balls, means forming a passage leading outwardly from said container, said passage being adapted to receive said balls and being formed with a slot along a portion of said passage extending from the entrance thereof, a disk having peripheral teeth adapted to extend into said passage through said slot and intertooth spacings adapted to receive said balls, said disk being mounted in said container for successive movement of said teeth into said passage through the entrance thereof and out of said passage through said slot, and means for driving said disk to feed balls supplied to said intertooth spacings into said passage, said slot being formed narrower than the diameter of said balls to ensure stripping of said balls from said disk as said teeth emerge from said passage through said slot.

9. Apparatus for feeding balls including in combination means forming a passage for receiving one of said balls, a toothed element mounted for movement of the teeth thereof along a path into said passage, means for supplying balls to the intertooth spacings of said element along said path, and means for driving said element to feed said balls along said passage, said passage-forming means having portions adapted to engage said balls to remove said balls from said intertooth spacings.

10. Apparatus for feeding balls including in combination means forming a passage for receiving said balls, an element formed with an aperture for receiving one of said balls, said element being mounted for movement of said aperture into said passage, and means for driving said element to feed a ball supplied to said aperture along said passage, said passage-forming means having portions adapted to engage said ball to remove said ball from said aperture.

11. Apparatus for feeding balls including in combination means forming a passage for receiving said balls, an element formed with an aperture for receiving one of said balls with a portion thereof extending outside said aperture, said element being mounted for movement of said aperture along a path toward said passage, means for supplying a ball to said aperture, means for driving said element to feed said ball to said passage, and means disposed along said path outside the region swept by said element for engaging said portion of said ball to direct said ball from said aperture into said passage.

12. Apparatus for feeding balls including in combination means forming a passage for receiving said balls, a rotary element formed with an aperture for receiving one of said balls with a portion thereof extending outside said aperture, said element being mounted for movement of said aperture along a path toward said passage, means for driving said element to feed a ball supplied to said aperture to said passage, and means disposed along said path outside the region swept by said element for engaging said portion of said ball to direct said ball from said aperture into said passage.

13. Apparatus for feeding balls including in combination means forming a passage for receiving said balls, an element formed with an aperture for receiving one of said balls with a portion thereof extending outside said aperture, said element being mounted for movement of said aperture along a recirculating path toward said passage, means for driving said element to feed a ball supplied to said aperture to said passage, and means disposed along said path outside the region swept by said element for engaging said portion of said ball to direct said ball from said aperture into said passage.

14. Apparatus for feeding balls including in combination means forming a passage for receiving said balls, an element formed with an aperture for receiving one of said balls with a portion thereof extending outside said aperture, said element being mounted for movement of said aperture along a path toward a passage, means for driving said element to feed a ball supplied to said aperture to said passage, and means disposed along said path outside the region swept by said element for engaging said portion of said ball to direct said ball from said aperture into said passage.

15. Apparatus for feeding balls including in combination a container for holding a supply of balls, said container having an inner wall and a base, means forming a passage leading outwardly through said wall, said passage being adapted to receive said balls and being formed with a slot along a portion of said passage extending from the entrance thereof, a disk having peripheral teeth adapted to extend into said passage through said slot and intertooth spacings adapted to receive said balls, said disk being mounted in said container over said base for successive movement of said teeth into said passage through the entrance thereof and out of said passage through said slot, and means for driving said disk to feed balls supplied to said intertooth spacings into said passage, said base and said inner wall cooperating with said disk to confine said balls to said intertooth spacings as said balls are moved toward said passage, said slot being formed narrower than the diameter of said balls to ensure stripping of said balls from said disk as said teeth emerge from said passage through said slot.

16. Apparatus for feeding balls including in combination a container for holding a supply of balls, said container having an inner wall and a base, means forming a passage leading outwardly through said wall, said passage being adapted to receive said balls and being formed with a slot along a portion of said passage extending from the entrance thereof, a disk having peripheral teeth adapted to extend into said passage through said slot and intertooth spacings adapted to receive said balls, said disk being mounted in said container over said base for successive movement of said teeth into said passage through the entrance thereof and out of said passage through said slot, means for driving said disk to feed balls supplied to said intertooth spacings along a circular path into said passage, said base and said inner wall cooperating with said disk to confine said balls to said intertooth spacings as said balls are moved toward said passage, said slot being formed narrower than the diameter of said balls to ensure stripping of said balls from said disk as said teeth emerge from said passage through said slot, and means comprising a resilient element disposed over a portion of said ball path adjacent said passage for preventing said balls from entering said intertooth spacings at the entrance to said passage.

* * * * *